US008158087B2

(12) United States Patent
Caze et al.

(10) Patent No.: US 8,158,087 B2
(45) Date of Patent: Apr. 17, 2012

(54) COATED MICROSTRUCTURE AND METHOD OF MANUFACTURE

(75) Inventors: Philippe Caze, Fountainebleau (FR); Christophe Remy, Thomery (FR); Pierre Woehl, Cesson (FR)

(73) Assignee: Corning Incorporated, Corning, NY (US)

(*) Notice: Subject to any disclaimer, the term of this patent is extended or adjusted under 35 U.S.C. 154(b) by 670 days.

(21) Appl. No.: 10/696,052

(22) Filed: Oct. 28, 2003

(65) Prior Publication Data

US 2004/0123626 A1    Jul. 1, 2004

(30) Foreign Application Priority Data

Oct. 29, 2002  (EP) .................................. 02292688

(51) Int. Cl.
*B01J 8/02* (2006.01)
(52) U.S. Cl. ........ 422/602; 422/603; 422/617; 422/211; 422/222; 422/240
(58) Field of Classification Search .................. 422/602, 422/603, 617, 211, 222, 240
See application file for complete search history.

(56) References Cited

U.S. PATENT DOCUMENTS

| | | | |
|---|---|---|---|
| 3,357,916 A | | 12/1967 | Smith |
| 3,518,206 A | * | 6/1970 | Stiles et al. ................ 502/64 |
| 3,843,341 A | * | 10/1974 | Hammel et al. ............ 502/202 |
| 5,853,446 A | | 12/1998 | Carre et al. |
| 5,993,750 A | * | 11/1999 | Ghosh et al. ............... 422/603 |
| 6,595,232 B2 | | 7/2003 | Guzman et al. ............. 137/833 |
| 6,960,235 B2 | * | 11/2005 | Morse et al. ................ 422/198 |
| 2001/0016188 A1 | * | 8/2001 | Haga et al. ................ 423/648.1 |
| 2002/0055655 A1 | | 5/2002 | Leipprand et al. |
| 2005/0167354 A1 | * | 8/2005 | Caze et al. ................ 210/321.84 |
| 2005/0170142 A1 | * | 8/2005 | Remy ........................ 428/141 |

FOREIGN PATENT DOCUMENTS

| | | |
|---|---|---|
| EP | 1205463 | 10/2001 |
| WO | WO95/26796 | 10/1995 |
| WO | WO 00/21659 A1 * | 4/2000 |
| WO | WO01/12312 | 2/2001 |

OTHER PUBLICATIONS

Claus et al. Miniaturization of screening devices for the combinatorial development of heterogeneous catalysts. Catalysis Today, vol. 67, Issue 4, Jun. 15, 2001, pp. 319-339. Available online on Jul. 3, 2001.*

Haas-Santo et al. Preparation of microstructure compatible porous supports by sol-gel synthesis for catalyst coatings. Applied Catalysis A: General 220 (2001) 79-92.*

* cited by examiner

*Primary Examiner* — Jennifer A Leung
(74) *Attorney, Agent, or Firm* — Gregory V. Bean (57) ABSTRACT

A microstructure for chemical processing and manufacture is disclosed. The microstructure includes a plurality of microchannel walls constructed of glass, ceramic, glass-ceramic or combinations of these materials, which define at least one microchannel for accommodating chemicals to be processed. At least one coating layer including a catalyst support and a catalyst is adhered to the plurality of microchannel walls. A method of manufacturing a microstructure for chemical processing and manufacture is also disclosed.

21 Claims, 7 Drawing Sheets

COATED MICROSTRUCTURE AND METHOD OF MANUFACTURE

CROSS-REFERENCE TO RELATED APPLICATIONS

This application claims the benefit of priority under 35 U.S.C. §119 of European Patent Application Serial No. 02292688.5 filed on Oct. 29, 2002.

BACKGROUND OF THE INVENTION

1. Field of the Invention

The present invention generally relates to microstructures, and more particularly, microstructures having coated microchannel walls for facilitating chemical processing and/or manufacture.

While the present invention is subject to a wide range of applications, it is particularly well suited for improving catalytic reactions within one or more microchannels of a microreactor.

2. Technical Background

Chemical reactors are widely used in industry to carry out reactions between two or more chemical components, for example, between liquids and liquids, gases and gases, slurries and slurries, liquids and gases, liquids and slurries, gases and slurries, solids and solids, solids and liquids, solids and gases and solids and slurries. Many of these reactors are large, fixed-site units designed for continuous operation at roughly constant throughput. These reactors typically have a conventional shell-and-tube design where in reactants pass through catalyst-containing tubes while heat, usually in the form of hot gases contained within the shell, is applied to the outside of the tube.

A major drawback to shell-and-tube type reactors in general is the size of the reactors themselves. Their relatively large size makes these reactors less desirable for use in applications requiring a more compact reactor. These and other conventional processing equipment also suffer from additional disadvantages. It has long been recognized in the chemical industry that "scale-up" from laboratory bench scale to commercial production scale is difficult. Results achieved in the laboratory are often difficult at production rates in production facilities. The conventional wisdom of "economy of scale" is based upon economic considerations which relate production rate (units of production per unit of time) to capital investment. This conventional approach results in less than optimum precision of control of chemical processing.

In recent years, these and other shortcomings have been largely overcome with the advent of microreactor technology. Microreactors, i.e., structures having one or more microchannels through which fluids may be passed and caused to react, although in their infancy, have been successfully developed and operated for homogeneous applications (applications where a plurality of reactants or the reactant(s) and catalyst(s) are in the same phase, for example, the liquid phase). Although microreactors and microreactor systems have been developed for heterogeneous applications, i.e., applications where the plurality of reactants or the reactant(s) and the catalyst(s) are in different phases, such microreactors have met with substantially less success.

Generally speaking, typical heterogeneous applications within microreactors involve the use of one or more catalyst(s). A catalyst increases the rate of a reaction without being consumed by it, and typically operates by lowering the activation energy for a chemical reaction. Most commonly, the preferred catalyst for use in microreactors is a solid catalyst that increases the rate of a fluid phase or multi-phase (gas, liquid, or gas-liquid) reaction. An optimum catalyst should have the preferred attributes of activity, selectivity, stability, and regenerability. Unfortunately, obtaining and retaining all of these catalyst attributes in the field of microreactors is a difficult task.

While microreactors have been manufactured from materials such as silicon, the vast majority of microreactors have been fabricated from metals, such as, stainless steel. Accordingly, most of the research relating the use of catalysts in microreactors has been directed to the use of catalysts in metal microreactors. One widely used approach in such metal microreactors is to pack a plurality of small solid particles of catalyst material within the microreactor microchannel, and thereafter flow the reactant(s) across the, "packed-bed." The predominate drawback to such a technique is the pressure drop created within the microreactor when utilizing such an approach. Additionally, in multi-channel microreactors or microreactors in parallel, differential drops in pressure will significantly affect performance. Moreover, stability of the packed-bed is an issue as rapid flow velocities within the microchannel(s) tend to displace the catalyst particles leading to catalyst attrition and then decreased performance, and the need for a filtration step.

As a result of these shortcomings, attempts have been made to coat the microchannel walls within metal microreactors. Suitable coating techniques have included dip coating, brushing, spraying, and sputtering. Due in particular, however, to the thermal expansion differences between the metallic wall surfaces of such microreactors and the catalyst carrier, particularly alumina, it is extremely difficult to have strong coating adherence to the microchannel walls utilizing such approaches, as it is well known that the adhesion of typical catalyst carriers to metal is very poor. This is particularly true when coating thicknesses exceed several tens of microns. Moreover, there is often low chemical compatibility between metallic microreactors and certain chemical conditions. For example, stainless steel is susceptible to pitting in the face of certain acid conditions such as, but not limited to, exposure to hydrochloric acid (HCl), halogens, or derivatives thereof. As a result, metallic microreactors coated with or otherwise housing catalysts are limited to a narrow range of chemical reactions.

What is needed therefore but seemingly unavailable in the art, is a more efficient, and more robust approach to chemical, and in particular, catalytic reactions within microreactors. Such an apparatus should provide adequate controls for the catalytic reactions occurring therein, and coatings within such apparatus should be resistant to cracking and spalling. The material from which the microreactor is manufactured and the catalyst containing coating material and method of applying the coating material should be highly compatible with respect to adhesion. In addition, the catalyst coated microreactor of the present invention should be capable of withstanding internal pressures far greater than 6.0 bars. It is to the provision of such an apparatus and method that the present invention is primarily directed.

SUMMARY OF THE INVENTION

In one aspect, the present invention is directed to a microstructure for chemical processing and manufacture. The microstructure includes a plurality of microchannel walls defining at least one microchannel for accommodating chemicals to be processed, and at least one coating layer including a catalyst support and a catalyst adhered to the plurality of microchannel walls. The microchannel walls may be formed of glass, ceramic, glass-ceramic, or a combination of these materials.

In another aspect, the present invention relates to a method of manufacturing a microstructure for chemical processing and manufacture. The method includes the steps of filling a microchannel defined by a plurality of microchannel walls with a slurry, removing a portion of the slurry from the microchannel such that a slurry layer coats the plurality of microchannel walls, and heating the slurry layer for a sufficient time and at a sufficient temperature to cure and bond the slurry layer to the plurality of microchannel walls. The microchannel is configured to accommodate chemicals to be processed and the plurality of microchannel walls are formed of glass, ceramic, glass-ceramic or a combination of these materials.

The microstructure and method of the present invention provide a number of advantages over other microstructures and methods known in the art. For example, the micro-scale internal dimensions of the reaction channel coated in accordance with the present invention maximizes reactant(s)/catalyst(s) contact within the reaction channel without a drop in internal pressure. As a result, the reaction rate is maximized within the microreactor microchannel(s) of the present invention. Moreover, microchannel walls coated in accordance with the present invention provide homogeneity of fluid flow and temperature throughout the microchannels, which substantially eliminates, "hot spots."

The small size of the channel also provides greater control over variables such as temperature control and flow rates. Moreover, the gas/liquid, liquid/liquid, and liquid/solid mass transfer coefficients may be greatly enhanced due to the flow regime control provided inside the narrow reaction channel.

In addition, the compatibility between the material(s) forming the microchannel walls of the microreactor of the present invention and the coatings used to support the selected catalysts provide for strong adhesion between the coating and the microchannel walls. Accordingly, the coatings are durable, exhibit high resistance to thermal shock, are designed to withstand prolonged exposure to fluid flow (both liquid and gas-liquid), and are resistant to chipping or spalling.

Additional features and advantages of the invention will be set forth in the detailed description which follows and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

DETAILED DESCRIPTION OF THE PREFERRED EMBODIMENTS

The present invention is broadly directed to a microstructure for conducting catalytic reactions. Such a microstructure is particularly well suited for supporting one or more coating layers on the interior walls bounding one or more microchannels within the microstructure device. Such microchannels having walls coated with catalyst containing layers may preferably define, among other things, a reaction chamber in a microreactor. Microreactors defining such reaction chambers may be stacked or otherwise arranged in accordance with the present invention to increase reaction chamber activity, fluid throughput through such microreactors, and thus the volume of reactants processed, and/or chemicals manufactured, in accordance with the present invention.

A microfluidic reactor system, such as a microreactor system manufactured in accordance with the present invention may also include a support structure for retaining the various flow control components, mixing devices, thermal controls, sensing units, separation chambers, analyzing chambers, monitoring chambers, other types of reaction chambers, and/or any other components or devices typically associated with microfluidic chemical processing apparatus and systems known in the art.

In accordance with the present invention, catalytic reactions may preferably be effectively conducted on a micro-scale. As used herein, the phrase, "conducted on a micro-scale" is intended to mean, within a microchannel, the smallest cross-sectional dimension of which is in the range of between about 0.1 μm to about 3.0 mm. Microfluidic reactors may now be manufactured to include microchannel walls coated with one or more catalyst containing catalyst support layers, which enables efficient catalytic reactions within the micro-scale channel or channels of a microfluidic reactor. Because the channels of such a microfluidic reactor are so small, the surface area-to-volume ratio within such microchannels is extremely high. When one or more catalyst(s) are disposed within such a microchannel in accordance with the present invention, there is a significant increase in reactant exposure to the catalyst, which results in greater productivity or yield as a result of, among other things, the increased reaction rate.

In accordance with a preferred embodiment of the invention, a microreactor having microchannel walls coated with a coating of support material and one or more catalysts and a method of manufacturing such a microreactor are provided that offer significantly improved catalyst effectiveness for slow as well as fast reactions, e.g., reactions that may involve liquid phase processing and/or that require relatively long catalyst contact, or residence times. The improved catalytic effectiveness of the invention is achieved through the use of a slurry deposition process that results in a coating of substantial thickness and controlled porosity in combination with properties of the materials used to fabricate the microreactor walls. The active catalyst is purposefully substantially uniformly distributed throughout the coating to achieve optimal effectiveness for the particular reactant stream and/or reactant combination being processed.

Characteristic features of these coatings, in addition to their controlled thickness and structural characteristics, are full physical integrity (substantial freedom from cracks), and high resistance to erosion even under reactor conditions involving rapid or turbulent flow conditions, whether of single phase (gas or liquid) or two-phase (gas and liquid) composition. The compatibility of these coatings with the materials used to fabricate the microreactors of the present invention, i.e. glass, glass-ceramic and ceramic, provide strong binding between the coatings and the microchannel walls. Such binding characteristics simply are not attainable in conventional metal microreactors.

The invention preferably includes a coating that includes an inorganic catalyst support disposed on at least the interior surfaces defining the microchannel(s) of the inorganic microchannel walls of the microreactor. For the purpose of the present description coated microstructures and coated microreactors are both characterized as integral structures defining internal void spaces (microchannels, cavities or the like) bounded by internal surfaces (or microchannel walls) and within which a reactant stream entering the microreactor for treatment comes into contact with catalytically active species in the coating layer(s) disposed on the microchannel walls. Coated microstructures and coated microreactors are not intended to include monolithic extruded ceramic honeycomb structures used within catalytic converters in the automobile industry. Such structures are stand alone devices having parallel channels. The catalyst support, which is generally of oxide composition, will preferably have a predetermined porosity. The microreactor, including the microchannel walls, is preferably made of glass, glass-ceramic and/or ceramic composition. The microchannel walls may be solid structures or may be porous structures, such as porous membranes.

In the case of a preferred microreactor, the catalyst support may preferably be coated on the channel walls as a porous inorganic catalyst support layer. That layer will preferably (i) occupy between about 10% and about 95% of the surface of the microchannel cross section when the cross section is taken perpendicular to the fluid flow path, (ii) provide an open and interconnected porosity of at least 5%, more preferably at least 30%, and (iii) be characterized by a mean pore size in the range from $0.2$-$10^4$ nanometers. For certain microreactor microchannels, the layer thickness may be between about 10 µm and about 200 µm. Disposed on or within the pore structure of this catalyst support will preferably be a metal, metal oxide or other catalytically active species having activity and selectivity for the particular reaction for which the coated microreactor is to be used.

The invention further preferably includes a method for making a coated microreactor as described above. In accordance with a preferred method, a slurry is passed into a microreactor incorporating one or more internal voids or channels defined by microchannel walls made of glass, glass-ceramic, and/or ceramic materials. The slurry is preferably directed into the microchannel under pressure through an inlet such that the slurry completely fills the microchannel. The slurry may include a catalyst support and a catalyst, in which case the coating may be applied to the microchannel walls in a single step. In another embodiment, the slurry may only include the catalyst support. In such an embodiment, the catalyst may be deposited on or through the catalyst support in a second process step utilizing a catalyst impregnation technique as will be described in greater detail below.

The slurry preferably includes a liquid phase that constitutes or contains a precursor for a permanent inorganic binder for the oxide catalyst support. The inorganic binder, typically a metal oxide binder, is selected for its effectiveness in forming an adherent coating of the desired internal pore structure. The composition of the binder may be the same as or different from the composition of the catalyst support, and its precursor will generally be an organometallic or inorganic compound of a metal that is soluble or highly dispersible in the liquid phase of the slurry.

After the microchannel has been filled with the slurry, a portion of the slurry is removed from the microchannel such that a slurry layer coats the plurality of microchannel walls. Typically, the slurry is allowed to drain from an outlet in the microreactor using, for example, forced air circulation, vacuum aspiration, or some other fluid that is nonmiscible with the slurry. The microreactor and its included slurry layer may then preferably be dried and heated to a temperature at least sufficient to remove the liquid phase from the slurry to form a coating layer. Further heating to cure or partially sinter this layer is preferably undertaken immediately after the removal of the liquid, but may alternatively be deferred until after deposition of additional layers. Thus, following removal of the liquid phase from the coating layer, the steps of filling the microchannel with a slurry, removing at least a portion of the slurry from the microchannel, drying and heating to remove the liquid phase can be repeated to form one or more additional coating layers on the initial coating layer. This process may be repeated until the combination of the first coating layer and any additional coating layers reaches a thickness that will provide the appropriate reaction kinetics for a given catalytic reaction. Final heating to cure the last and any underlying uncured layers may then be carried out.

The step of providing a catalytically active species on or within at least one, though more preferably all, of the coating layers may be carried out either during the slurry deposition, after each coating layer has been deposited, or after all coating layers have been deposited. Moreover, catalyst impregnation may occur either before or after curing.

The process thus offers the option of a completely homogenous distribution of catalyst throughout the entire thickness of the coating, or alternatively a layered coating wherein the layers may not only contain different catalytic species, but may also differ from adjacent layers as to thickness, porosity, or both. The steps that can optionally be followed to vary the composition, pore morphology, or other properties of the catalyst support for the purpose of adapting the coating to specific applications are several. For example, catalysts or other additives may be included in the slurry composition, or instead deposited on the powdered oxide catalyst support added to the slurry. The latter procedure is particularly effective to insure a wide distribution of catalyst throughout the thickness of the catalyst support layer after curing.

Also useful as optional slurry constituents are pore-forming additives that can be used to modify the pore structure of the layers through subsequent thermal or chemical treatment thereof. Constituents that promote gelling of the deposited layers prior to drying may also be included in the slurry as a means to increase deposited layer thickness, modify the final coating microstructure, or control the geometrical shape of the deposited layers.

Reference will now be made in detail to the present preferred embodiments of the present invention, examples of which are illustrated in the accompanying drawing figures. Wherever possible, the same reference numerals will be used throughout the drawings to refer to the same or like parts. An exemplary embodiment of the microstructure, preferably a coated microreactor, of the present invention is shown in FIG. 1 and is designated generally throughout by reference numeral 10.

Figure 1:
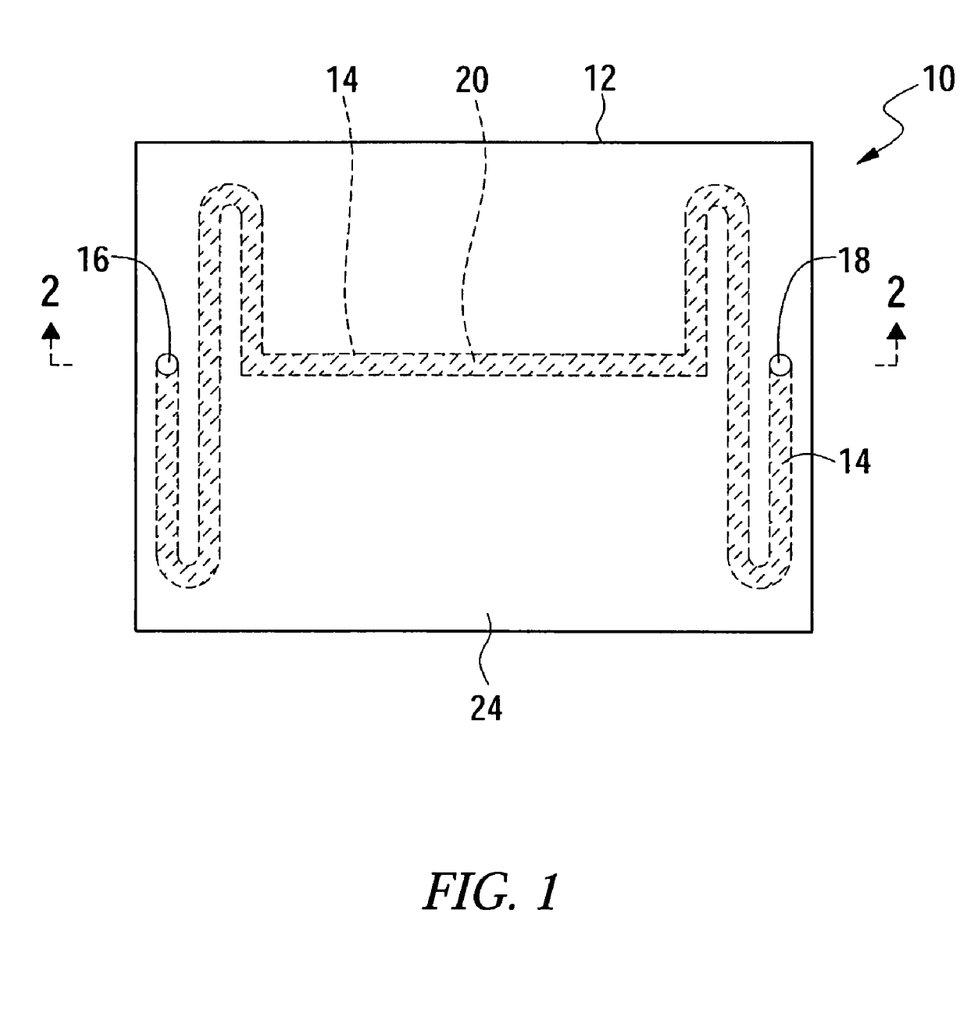
FIG. 1 is a top view of a preferred microreactor coated in accordance with the present invention.

Generally speaking, and as depicted in FIG. 1, coated microreactor 10 of the present invention preferably includes at least one reaction cell 12 for performing a catalytic reaction on a micro-scale. Reaction cell 12 may preferably include at least one microchannel 14 having an inlet 16 and an outlet 18 for the passage of a reactant(s) therethrough, and as will be described below, for the insertion and removal, respectively, of a slurry. A coating layer 20 including a catalyst support and a catalyst (represented by cross-hatching) is preferably disposed within microchannel 14 such that coating layer 22 may catalytically react with any reactants passed through microchannel 14.

Figure 2:
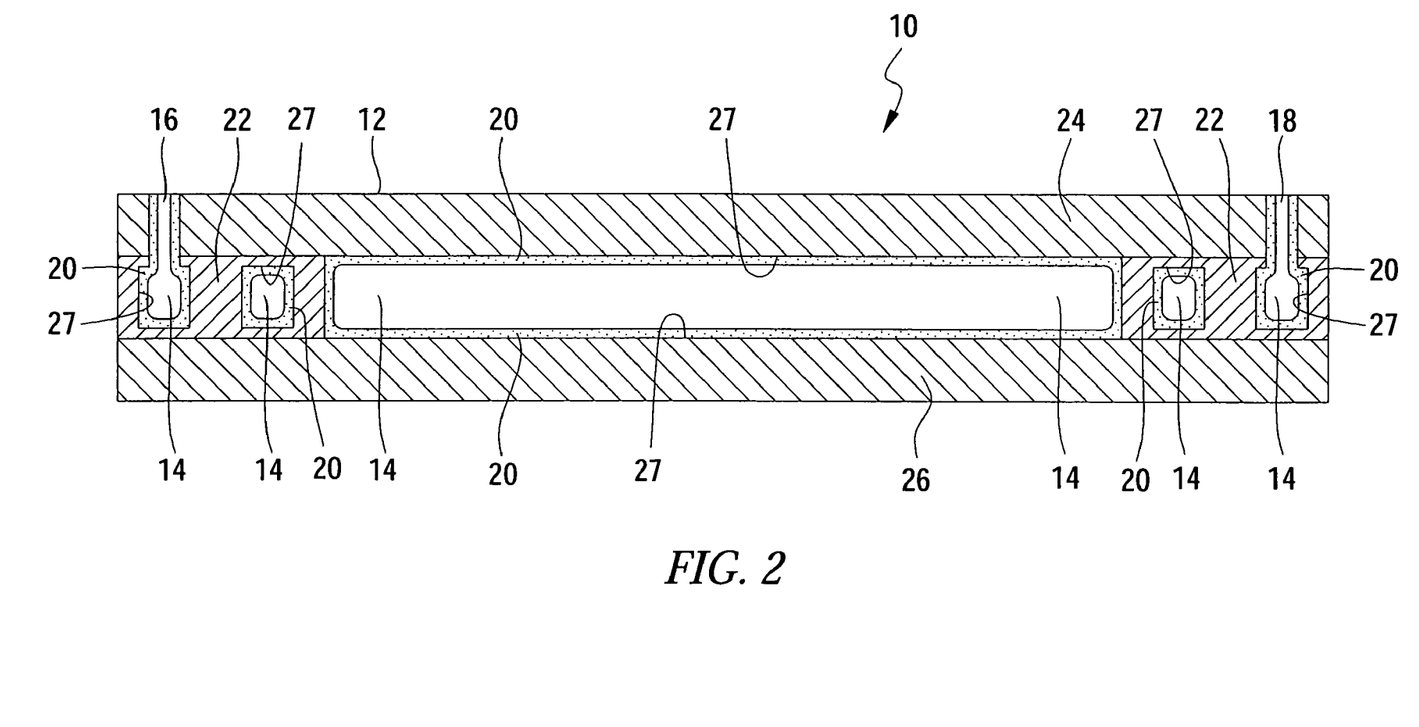
FIG. 2 is a cross-sectional view of the coated microreactor taken along lines 2-2 of FIG. 1.

Generally speaking, and as will be described in greater detail below with reference to the method of manufacturing a coated microreactor in accordance with the present invention, microchannel 14 is preferably disposed between a first substrate 24 and a second substrate 26 (FIG. 2). As shown in FIG. 2, microchannel 14 is preferably defined by a plurality of microchannels walls 22. The phrase, "microchannel walls 22" is intended to mean any surface made of glass, glass-ceramic, or ceramic materials that defines microchannel 14. Accordingly, in some embodiments, microchannel walls 22 may also include those surfaces of substrate 24 and second substrate 26 that bound microchannel 14. As shown clearly in FIG. 2, all of the interior surfaces 27 of microcell 12 are coated with coating layer 20. For the embodiment depicted in FIGS. 1 and 2, substrate 24, second substrate 26 and microchannel walls 22 disposed therebetween are preferably made of glass. As will be described in greater detail below, microchannel walls 22 may preferably be formed from glass frit that is shaped via a micromolding process atop of second substrate 26. Thereafter, first substrate 24 is affixed to the top surfaces of microchannel walls 22 to close reaction cell 12. Inlet 16 and outlet 18 may be preformed within first substrate 24 or may be bored through first substrate 24 after closure, as by, for example, drilling. Although not required, microchannel 14 may be a tortuous channel, which may, among other things, provide static mixing functionality within reaction cell 12.

Figure 3:
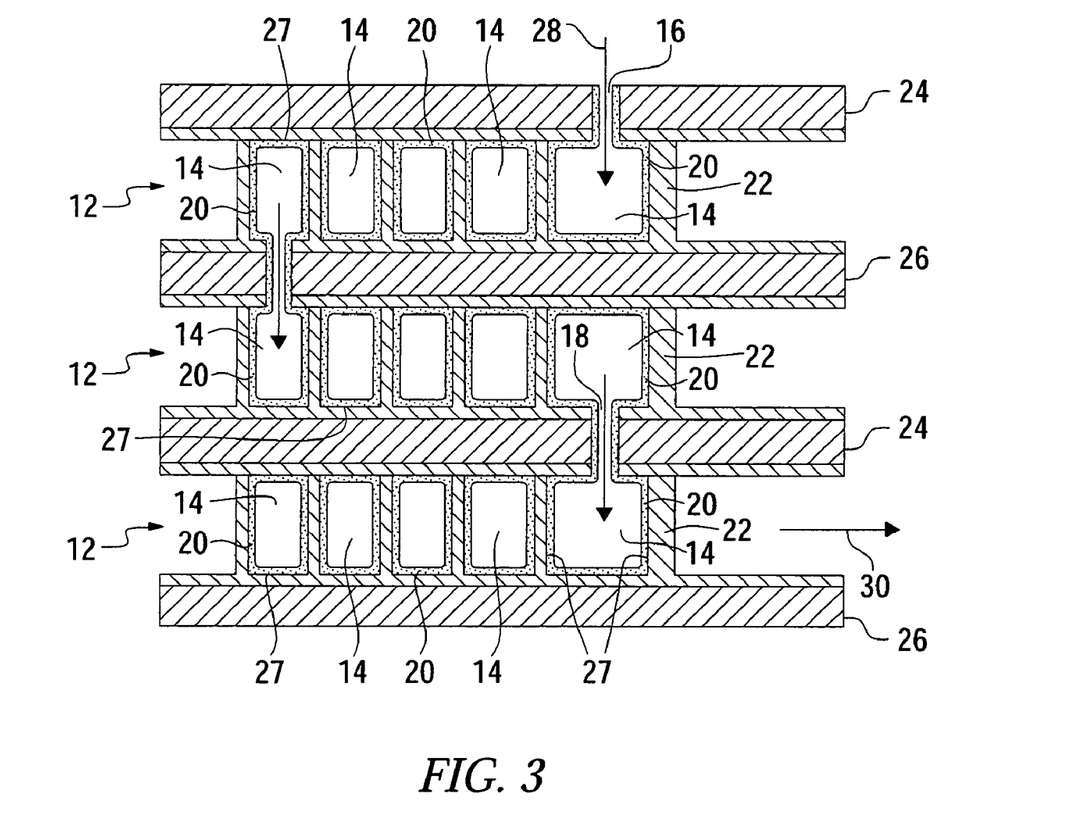
FIG. 3 is a cross-sectional view showing the operation of a coated microreactor including a plurality of stacked microcells coated in accordance with one aspect of the present invention.

In operation and as shown in FIG. 3, one or more reactants 28 may preferably be introduced through inlet port 16 and is preferably continuously passed through microchannel 14 formed within reaction cell 12 of coated microreactor 10. As shown in FIG. 3, a plurality of reaction cells 12 have been stacked one atop the other and are in fluid communication via aligned inlet and outlets 16 and 18. As one or more reactants 28 are preferably pumped through coated microchannel 14, one or more reactants 28 interact with the catalyst impregnated coating layer 20 on microchannel wall 22. As a result, a catalytic reaction preferably occurs within microchannel 14 and a reaction product or products 30 is thereafter passed through outlet 18 where it may preferably be further processed and/or analyzed.

The composition of the particular catalytically active species that may be impregnated within coating layer 22 is not critical, but may be determined in accordance with conventional practice, i.e., in view of the particular application or process environment within which the coating layer is to be utilized. Conventional catalysts that may be advantageously employed in accordance with the present invention include at least the precious metal catalyst of group VIII of the Periodic Table of Elements, as well as the transition metals of groups IV A, V A, VI A, VII A and VIII thereof. Acceptable catalyst supports for coating layer 22 include, but are not limited to, alumina, and in particular, gamma alumina, boehmites of fine particle size, silica, alumina silica and molecular sieves such as, but not limited to, zeolites.

Figure 4:
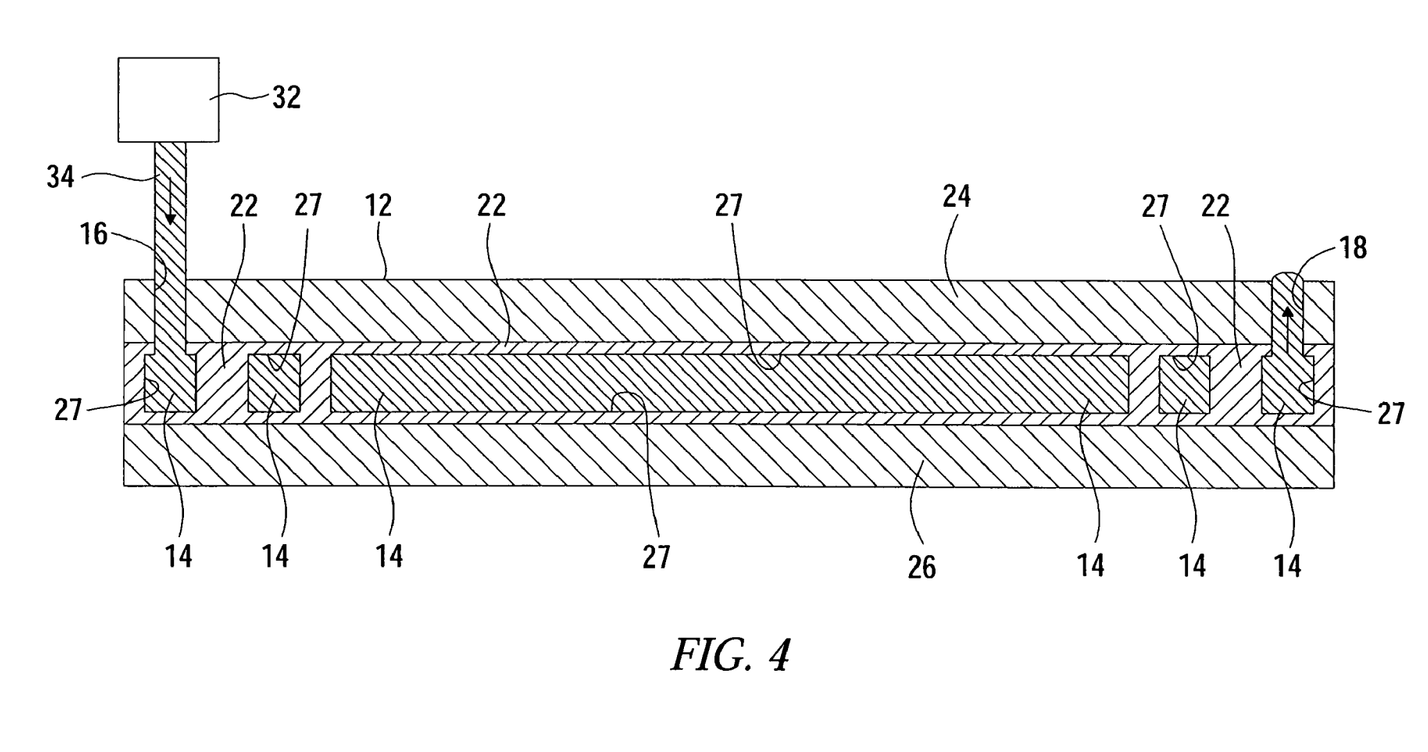
FIGS. 4-6 schematically depicts a preferred method of manufacturing a coated microreactor in accordance with the present invention.

A preferred method of manufacturing a coated microreactor 10 in accordance with the present invention will now be described with reference to FIGS. 4-6. As shown in FIG. 4, a source 32, such as, but not limited to, a syringe, for delivering a slurry 34 under pressure cooperates with inlet 16 to deliver slurry 34 through inlet 16 and into microchannel 14. In a preferred embodiment, slurry 34 is delivered into microchannel 14 until microchannel 14 is completely full and slurry 34 exits outlet 18. As mentioned above, at this point, slurry 34 includes a catalyst support and may or may not include a catalyst. For the purpose of this discussion, it will be assumed that slurry 34 includes both a catalyst support and a catalyst.

Figure 5:
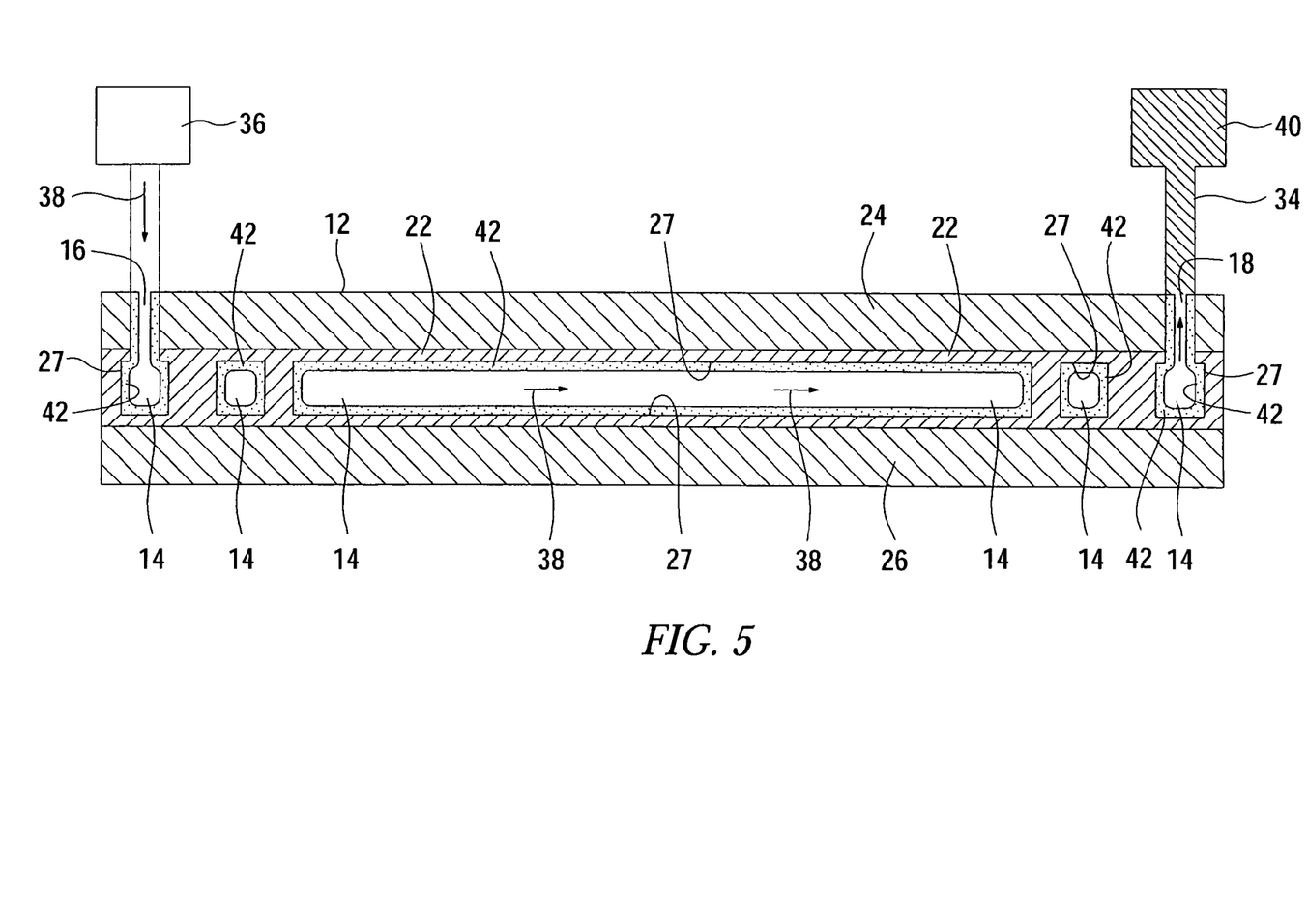
Figure 6:
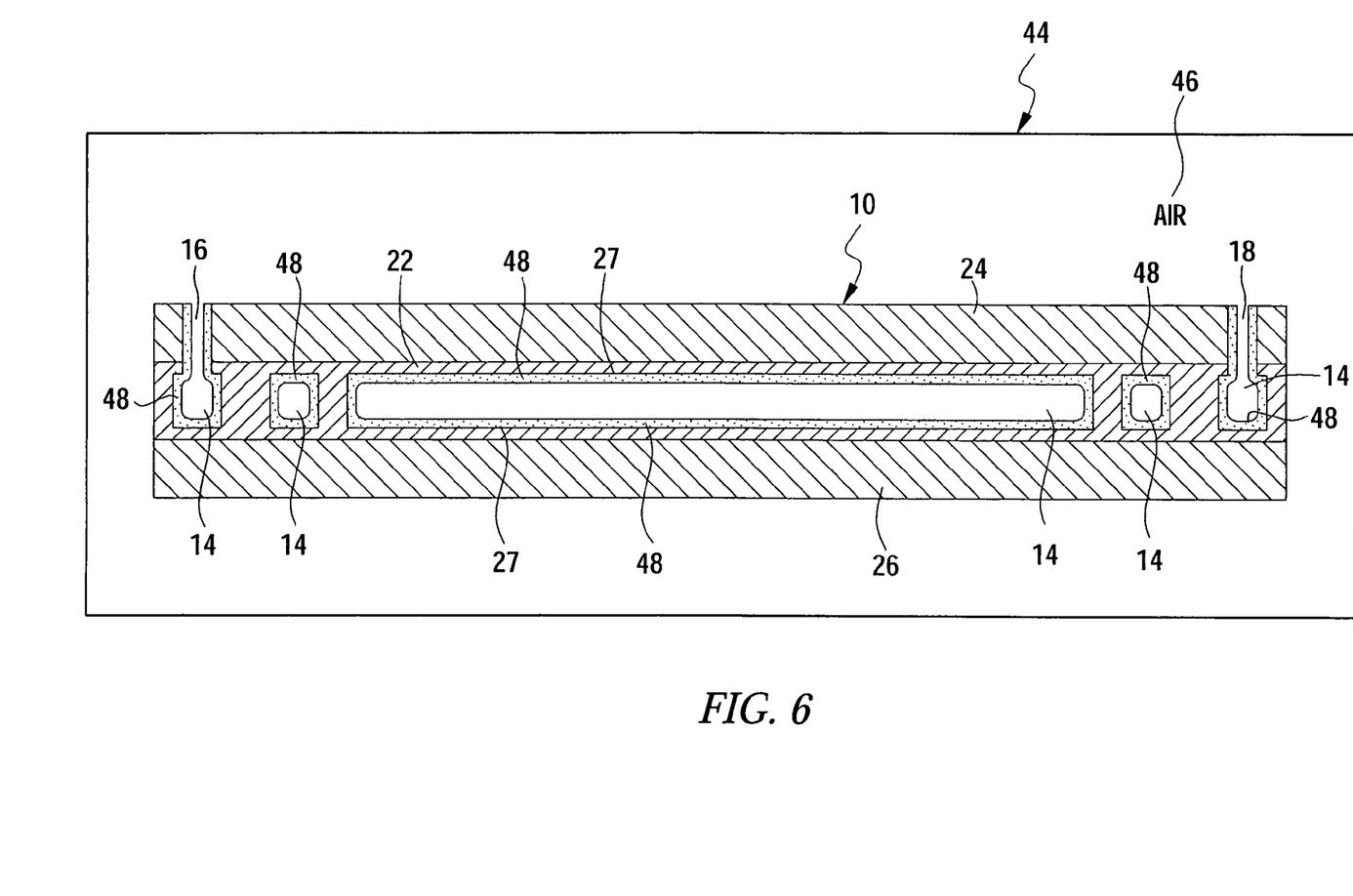

Once microchannel 14 has been filled with slurry 34 such that slurry 34 covers all of the microchannel wall surfaces 27 defining microchannel 14, at least a portion of slurry 34 is drained or otherwise removed from microchannel 14 as shown in FIG. 5. In accordance with a preferred embodiment of the present invention, a source 36 of forced air 38 may preferably cooperate with inlet 16 to deliver forced air 38 through microchannel 14 and out outlet 18. As forced air 38 travels through microchannel 14, a substantial portion of slurry 34 is forced through outlet 18 and into a collection vessel 40 cooperating with outlet 18. As shown in FIG. 5, a slurry layer 42 remains affixed to all of the microchannel walls 27 at the completion of this process.

Thereafter, slurry layer 42 is permitted to dry, preferably while exposed to an air flow having a low flow rate, for a period of time sufficient to remove most of the liquid phase from the slurry layer. As shown in FIG. 6, microcell 12 coated with slurry layer 42 is positioned within a heat source 44 and is heated to a temperature sufficient to cure and bind slurry layer 42 to the microchannel walls 27. Generally speaking, microcell 12 coated with slurry layer 42 may preferably be heated within an air atmosphere 46. Following heating in accordance with the present invention, coated microreactor 10 includes a solid coating layer including both a catalyst support and a catalyst well dispersed throughout the thickness of coating layer 48. In a preferred embodiment, coating layer 48 covers all of the internal wall surface within coated microreactor 10.

The above-described process may be repeated numerous times to apply additional slurry layers 42 atop of preceding slurry layers 42 resulting in a number of solid coating layers 48. In addition, coating layer 48 may be applied in a two-step process (not shown) in accordance with such a process, slurry 34 does not include a catalyst. A catalyst support containing slurry is delivered, removed, dried, and heated in accordance with the steps described above, and thereafter, a solution containing a desired catalyst is delivered into the slurry coated microchannel 14, either before, or after heating in order to impregnate the catalyst containing slurry layer, or catalyst containing coating (if after firing), with the catalyst as is conventionally known in the art.

Although the microcell 12 used to form coated microreactor 10 of the present invention may be made a number of different ways, a preferred method of manufacturing a microcell 12 for the microreactor 10 of the present invention preferably includes the steps of, forming, under a vacuum (to avoid trapping any bubbles of gas), a first mixture of an organic medium and a material that is a precursor for glass, glass ceramic, ceramic, or a combination thereof, on a first substrate made of a material selected from glasses, glass ceramics, ceramics, metals, semiconductors such as silicon or combinations thereof. In accordance with this "vacuum-assisted micromolding process," the precursor material concerned is preferably compatible in terms of thermal expansion coefficient with the material constituting the first substrate. The vacuum-forming is preferably implemented under conditions which confer at least a minimum amount of mechanical strength to the shapes generated.

The formed mixture is then preferably presintered by applying appropriate heat treatment to the assembly including the first substrate and the formed mixture (the presintering serves to eliminate the organic medium and to consolidate the structure). A second substrate made of a material selected from glasses, glass ceramics, ceramics, metals, semiconductors such as silicon or combinations thereof is then preferably applied, which material may be identical or different from that of the first substrate, the material being compatible in terms of thermal expansion coefficient with substantially all of the precursor materials with which it may come into contact. The second substrate being involved may be either untreated, coated on one of its faces with a second mixture of a thermoplastic medium and a material that is a precursor for glass, glass ceramic, ceramic, or a combination thereof, which mixture is optionally identical to that used on the first substrate, is not vacuum-formed, is optionally presintered, and in any event is compatible with the second substrate and with the first mixture, or indeed coated on one its faces with such a second mixture which has previously been vacuum-formed and presintered in succession. The two substrates may then be assembled together such that the mixtures optionally present on each of the substrates face each other. Although not required, the above operations may optionally be repeated at least once either identically or with variations concerning the nature of the second substrate, using the assembly that has already been obtained as the bottom or top portion of a structure that includes, in succession, two, three, and/or more cells. The resulting assembly, having one or more cells, may then be heat treated (fired) so as to bond together the precursor material(s) and the substrates, or so as to bond the different precursor materials together and to each of the substrates on which they have been deposited.

The vacuum-forming may be implemented in various different ways, in particular taking account of the nature of the organic medium mixed in the precursor material. The organic medium in the mixture can be constituted, in particular, by a thermoplastic medium, a thermosetting medium, or a photopolymerizable medium.

Generally speaking, the method may be initiated in one or more of the following ways. The first mixture may be placed on the first substrate prior to application of the mold in the forming operation (in a vacuum enclosure) or the mold may initially be placed on the first substrate, a vacuum established, and then the mixture injected therein. If a thermoplastic medium is used in the mixture, then the mixture may preferably be initially heated, shaped with an appropriate mold, and allowed to cool, after which the mold may be removed. If the medium is a thermosetting medium, then the mixture may be formed at ambient temperature with an appropriate mold, heated once it has been formed, cooled, and then the mold may be removed. If the medium is a photopolymerizable medium, then the mixture may be formed at ambient temperature with an appropriate mold. Once it has been formed, it may be exposed to appropriate radiation (UV-light, X-rays), after which the mold may be removed. As one of skill in the art will recognize, molds used may be prepared and adapted to the desired final shape from suitable master molds, in conventional manner.

Vacuum-forming generates shapes in relief in the mixture of precursor medium and organic material. In characteristic manner, according to the invention, the shapes are obtained by deforming the mixture while it is supported on a substrate. The substrate is preferably not subjected to any etching.

Since the presintering is preferably performed on a structure that is supported, it is simple to perform and the structure retains its planeness. Presintering serves to eliminate a major portion of the organic components from the mixture prior to assembly (prior to closing the structure). Eliminating volatile components from a complex three-dimensional structure is always difficult, since the gases must be able to escape without damaging the structure. The use of substrates made of glass, glass ceramic, ceramic, metal, or semiconductor is particularly advantageous in that, sub-structures can be formed easily without the need to produce and handle such sub-structures in a self-supporting configuration, which would be fragile. The structures do not sag or become distorted, thus making it possible to provide channel walls that are far apart and/or wall shapes that are complex, and it is easy to introduce additional parts such as electrical conductors, electrodes, or light conductors on the substrates with the mechanical behavior of the parts being minimally affected and in many cases, unaffected.

In conventional manner, presintering is generally implemented after a material that is inert relative to the precursor material, and that absorbs the organic medium, has been applied to the formed mixture. This minimizes the extent to which the formed mixture may sag or collapse. The absorbent material is generally powdered or sprayed onto the formed mixture for presintering.

When operations are not repeated, the method of the invention makes it possible to provide a single cell device (by assembling together first and second substrates; one of the substrates then acts as a bottom while the other acts as a cover plate). When operations are repeated, the method makes it possible to provide a device comprising n cells, using one or more common substrates. Such one or n cell devices can then be secured to one another by using a joining material, in particular an adhesive. Devices of the invention having one stage, n cells with common substrates, n stages stuck to one another (no common substrate), or n cells, some of them having common substrates and some of them having no common substrate, can all be used in a vertical position, in a horizontal position, in an inclined position, or in some other orientation known in the art.

The method of the invention for obtaining any element of the final device can be implemented in three main variant manners according to the type of cover plate involved. As mentioned above, the second ($n^{th}$) substrate can be applied to the presintered mixture of the first ($n-1^{th}$) substrate, untreated, (although this variant is not preferred, it is certainly not excluded), coated with an optionally presintered second mixture, the second mixture is preferably in the form of a uniform layer that has not been shaped, it can optionally be presintered and if it has not been presintered, then contact with the presintered first mixture is improved, and coated with a second mixture that has been vacuum-formed and presintered (like the first mixture). This exemplary implementation is advantageously performed with the two substrates in alignment in order to take advantage of the complementary shapes formed as recesses or channels in the mixtures. This makes it possible in microfluidic reactors of the present invention to obtain significant aspect ratios, which ratios may be greater than about 5.0.

In addition to the steps described above, the method of the invention can include additional steps. Passages may be provided by drilling, for example, to allow fluid circulation, to allow such fluids to enter and leave, and indeed, to allow them to pass from a channel in one element to a channel in another element. Drilling operations may also be performed on parts that are to be assembled together, advantageously through the presintered mixtures. In addition, one or more additional parts can be inserted, in particular, parts of the type specified above (electrical conductors, electrodes, light conductors, to name a few) on one of the substrates involved and/or in the precursor mixture involved, or indeed in an intermediate layer that is inserted between at least one of the first and second substrates and the corresponding first or second mixture. During manufacture of each of the elements of the device of the invention it is entirely possible to slide at least one intermediate layer (a fine layer of Si, a layer of glass, of ceramic, or glass ceramic) between a substrate and the precursor mixture for generating a portion of the reaction cell, in particular, electrodes that can be formed by conventional printing, photolithography, or electroforming techniques.

Figure 7:
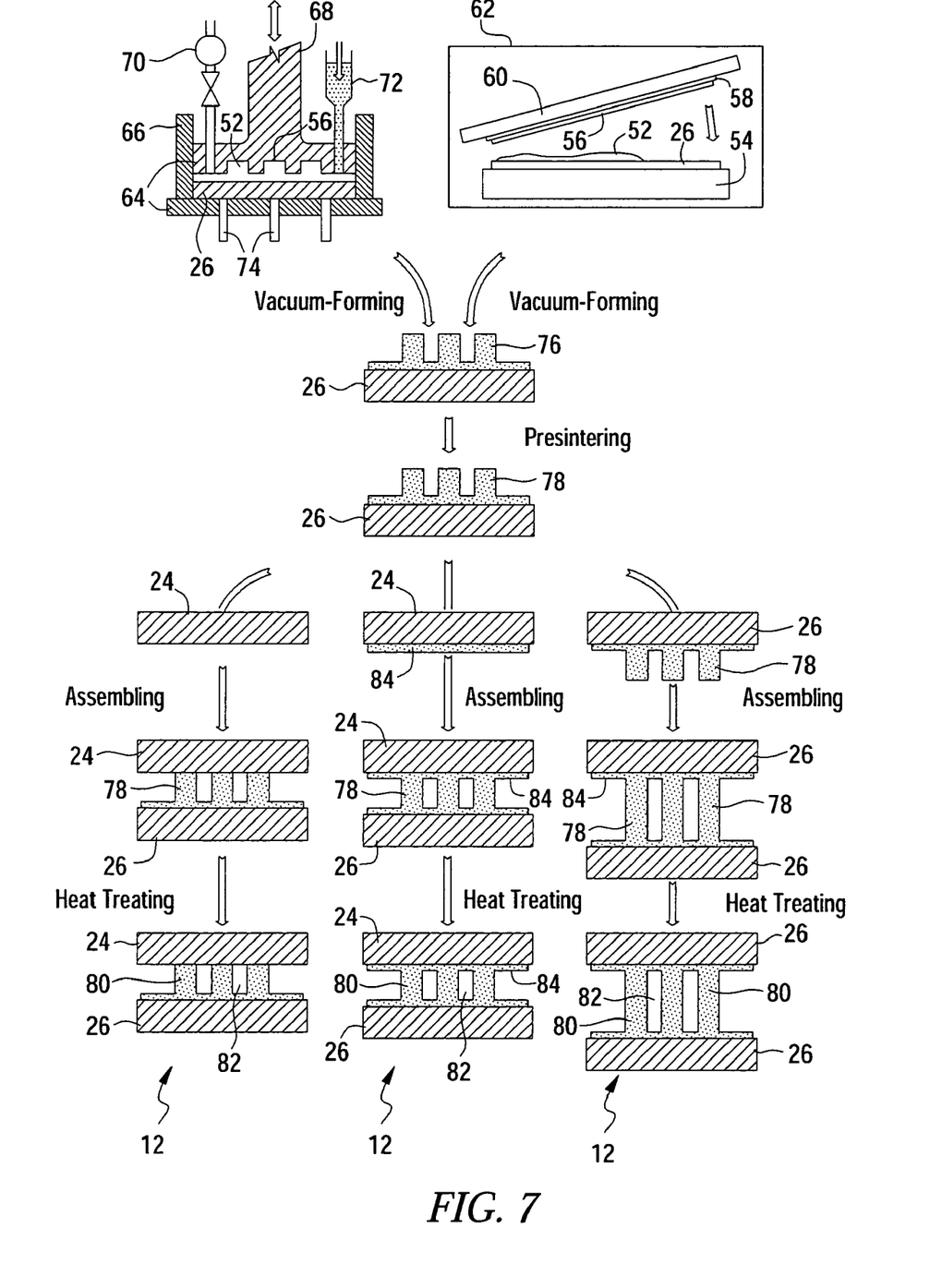
FIG. 7 schematically illustrates a preferred method of manufacturing a microcell used in making a coated microreactor in accordance with the present invention.

Exemplary embodiments of a method of manufacturing a microcell 12 for the coated microreactor of the present invention are shown in FIG. 7. Initially, and in a preferred embodiment, microstructures in relief are made on a substrate 26 (e.g. of glass or of silicon) with said microstructures being made by molding a mixture 52 including glass frit and a thermoplastic medium (for example). Two different techniques are shown diagrammatically. The technique in the upper right corner of FIG. 7 is similar to the technique described in U.S. Pat. No. 5,853,446, and more particularly to the method described in Example 4 of that patent, the disclosure of which is hereby incorporated herein by reference. In accordance with the method, mixture 52 is deposited on the substrate 26. Substrate 26 carrying the mixture 52 is placed on a thermostatically controlled support 54. A suitable mold made of elastomer 56 is prepared in advance. The mold is positioned on a support 58, which is itself secured to a heater element 60. The assembly including elements 60, 58, and 56 is degassed in a vacuum inside the enclosure 62 prior to being applied to the mixture 52 in the enclosure. Such degassing preferably degasses the mixture 52 and prevents any bubbles of gas from being trapped in the formed mixture.

The method in the upper left corner of FIG. 7 is based on injecting mixture 52 into the mold 56 after it has been placed in advance on the substrate 26. The assembly including the substrate 26 and the mold 56 is positioned between two hot plates 64 inside a jacket 66 suitable for opening and closing under the action of a piston 68. After the inside of the mold 56 has been evacuated by an evacuation mechanism 70, the mixture 52 is injected through an injector 72. At the end of the thermoforming process, the thermoformed assembly is ejected using ejector mechanism 74 acting through the bottom hot plate.

After the vacuum-forming step has been implemented, a mixture 76 is obtained that is secured to substrate 26, which mixture includes mixture 52 that has been thermoformed. The assembly is then subjected to heat treatment so that mixture 76 is presintered. It is then referenced 78 and consists mainly of heat-treated glass frit.

In parallel, a cover plate is prepared for the intended device. In a first embodiment, the cover plate includes a substrate 24 (optionally identical to substrate 26) which is placed untreated on mixture 78. The assembly is then subjected to heat treatment under suitable conditions to cause the three components of the resulting microcell 12, i.e. the substrates 26 and 24 with the fired one-piece microstructure 80 between them, to be securely united. Generally speaking, the microstructure preferably defines at least one channel 82.

In a second embodiment, the cover plate includes a substrate 24 (optionally identical to the substrate 26) coated in a uniform layer of a mixture 84 of glass frit and a thermoplastic medium (for example). Mixture 84 is optionally presintered. It therefore optionally includes significant quantities of thermoplastic medium. The resulting assembly is subjected to heat treatment under appropriate conditions for generating a microcell 12 in accordance with the invention. Its microstructure 80 plus 84 defines the channels 82.

In a third embodiment, the cover plate is of the same type as the bottom plate. It includes a substrate (the same substrate as 26 in the example shown) having a presintered thermoformed mixture secured thereto (the same mixture 78 in the embodiment shown). Thus, by placing the patterns in relief so that they are in alignment with each other, it is possible to obtain channels 8 of large volume (and presenting significant aspect ratios). The resulting assembly is subjected to heat treatment under suitable conditions to generate a microcell 12 of the present invention.

Further details relating to the method of manufacturing a microfluidic reactor in accordance with the present invention may be found in co-pending U.S. Non-provisional application Ser. No. 10/163,215, filed Jun. 4, 2002, and commonly owned by Corning, Incorporated, which is hereby incorporated herein by reference.

Alternatively, the glass microcell 12 used to manufacture the microreactor 10 of the present invention may also be manufactured by a conventional wet etching process or some other process known in the art.

The invention may be further understood with reference to the following detailed examples, which are intended to be illustrative of the present invention, rather than limiting.

EXAMPLE 1

Catalytic Glass Microreactors With Sol-Bound Coating

A durable alumina coating was provided on the interior channel walls of a glass microreactor made by a vacuum-assisted micromolding process. The microcell to which the coating was supplied was a square-celled microreactor having cross-sectional microcell dimensions of about 0.5 mm×0.7 mm.

To provide an alumina coating on the interior channel walls of this microreactor, a quantity of aluminum isopropoxide (99% by wt.) was first hydrolyzed by forming a mixture with hot water. The mixture was then peptized by the addition of nitric acid to achieve a pH of about 4.0 to produce an alumina sol binder solution containing about 1 mole of alumina per liter of sol.

A quantity of a high-surface-area gamma alumina powder (surface area of about 200 $m^2/g$) is then added to this alumina sol to produce a coating slurry for application to the microchannel walls of the microcell. A weight addition of about 0.3-0.4 parts, preferably 0.35 parts, powdered alumina to 1 parts of alumina sol was used to form an alumina slurry and the viscosity was then adjusted by the addition of an appropriate amount of water To form the alumina coating, the microreactor channels were filled with the alumina slurry, allowed to drain using, for example, forced air circulation, and the residual coating layer was then dried and cured by heating the microreactor and coating to a temperature of about 450° C., effectively binding the coating to the channel walls. The filling, draining, drying and curing steps were then repeated to deposit two additional coating layers onto the walls of the channels.

The firing schedule used to consolidate the coating in this example was as follows: First, the coated microcell was exposed to heat in order to uniformly increase the temperature of the microcell and coating from room temperature to 150° C. in forty (40) minutes. Thereafter, the microcell and coating were maintained at a temperature of 150° C. for a period of thirty (30) minutes. The temperature was then uniformly raised from 150° C. to 450° C. over a sixty (60) minute time period and maintained at 450° C. for an additional sixty (60) minutes. Thereafter, the coated microreactor was cooled down from 450° C. to room temperature over a one-hundred-twenty (120) minute time period. The coating was well-adhered and durable, exhibited good resistance to thermal shock, and was designed to withstand prolonged exposure to flowing liquid and gas-liquid feed streams, potentially carrying solid particles, without chipping or spalling.

EXAMPLE 2

Catalytic Glass Microreactors With Sol-Bound Coating

The experiment described above was carried out under the same conditions, but the glass microcell made by a vacuum-assisted micromolding process was replaced with a glass microcell made by a wet etching process. Substantially similar results were obtained.

EXAMPLE 3

Pt Catalyst On Alumina Coated Glass Microreactor

To prepare a structured platinum catalyst, a catalyst support in the form of an alumina-coated glass microreactor was made in accordance with the procedure described in Example 1 above. Thereafter, a catalyst preparation was made by dissolving $H_2PtCl_6$ in 80 ml water to form an aqueous solution containing about 0.4% platinum by weight. The coated microchannels were then filled with the prepared catalyst solution for the purpose of impregnating the coating layer with platinum throughout its thickness. The targeted platinum loading for the coating was about 0.3% by weight, calculating the platinum content as an oxide. Following the impregnation of the coating with the catalyst solution, the solution-treated catalyst support was dried and then heated in air to 400° C. to vaporize the water and convert the platinum compound to platinum, and then cooled to room temperature and examined.

The firing schedule for consolidation included heating the coated microreactor from room temperature to 150° C. in sixty-five (65) minutes. The coated microreactor was then maintained at 150° C. for thirty (30) minutes. Thereafter, the coated microreactor was heated from 150° C. to 400° C. in one-hundred-twenty-five (125) minutes and maintained at 400° C. for an additional sixty (60) minute time period. Finally, the coated microreactor was returned from 400° C. to room temperature in a two-hundred (200) minute time period. The rate at which the temperatures were increased and decreased was less than 2° C./min. in order to prevent any sintering of the Pt particles.

Electron microprobe examination of the catalyst-impregnated coating thus prepared showed a good distribution of the catalyst throughout the coating.

EXAMPLE 4

NiO Catalyst On Alumina Coated Glass Microreactor

To prepare a structured NiO catalyst, a catalyst support in the form of an alumina-coated glass microreactor was made in accordance with the procedure described in Example 1. For this example, a catalyst was then prepared by dissolving $Ni(NO_3)_2$ in water to form an aqueous solution.

The coated microreactor channels were then filled with the catalyst solution for the purpose of impregnating the coating with nickel oxide throughout its thickness. The targeted nickel loading for the coating was about 3% by weight. Following the impregnation of the coating with the catalyst solution, the solution-treated support was dried and then heated in air to 400° C. to vaporize the water and convert the nickel compound to nickel oxide, and then cooled to room temperature and examined. Electron microprobe examination of the catalyst-impregnated coating thus prepared showed a good distribution of the catalyst throughout the coating.

EXAMPLE 5

Alumina-Supported Pt Catalyst On Microreactors

An alternative method of making a structured catalyst in a microreactor involved uniformly impregnating a powdered oxide filler material with a catalyst prior to combining it with a selected sol binder solution. To provide a catalyzed alumina coating in accordance with this method the procedure of Example 1 was repeated, except that the gamma alumina powder introduced into the coating slurry was a powder that had first been catalyzed with platinum before being combined with the alumina binder sol.

A catalyzed alumina powder suitable for this purpose was prepared by treating a quantity of high-surface-area gamma alumina powder (surface area of about 200 $m^2/g$) with a $H_2PtCl_6$ catalyst solution such as in Example 3 above. Powder treatment was made by addition of the powder to the catalyst solution, while mixing, followed by drying of the thus-impregnated powder, and then heating in air at 400° C. The catalyzed alumina thus prepared was added to the alumina sol of Example 1, and a glass microreactor was then coated with the resulting catalyst-containing slurry. The product of this procedure was a coated structured platinum catalyst wherein a uniform, gradient-free distribution of the platinum catalyst across the entire thickness of the alumina coating was provided.

EXAMPLE 6

Structured Catalyst Support With Boehmite-Bound Coating

As an alternative to the use of a sol binder for a coating slurry, a binder addition of a sinterable particulate solid was employed. A useful sinterable solid for a gamma alumina coating was determined to be a boehmite (hydrated alumina) of fine particle size.

To prepare a coating slurry in this binder system, a powder blend consisting of about 80 parts of high-surface-area gamma alumina powder (surface area of about 200 $m^2/g$) and 20 parts by weight of a commercially available boehmite powder Pural SB from Sasol was first prepared. This powder blend was then mixed into an alcohol-water vehicle consisting of 25 parts water and 75 parts ethanol by volume, with thorough blending of the mixture to obtain a homogeneous dispersion.

The slurry thus provided was applied to the interior channel walls of a microreactor of the same geometry as that of the microreactor employed in Example 1. A procedure as described in Example 1 was followed to apply the individual coating layers, with the microreactor being drained and the slurry coating bonded to the channel walls by drying and firing to 550° C. after layer deposition.

EXAMPLE 7

Molecular Sieve Coating In A Glass Microreactor

Coatings incorporating molecular sieves such as zeolites for the acceleration or control of selected catalytic reactions can also be effectively provided through the use of sol binders in accordance with the invention. In one illustrative example, the procedure of Example 1 was followed except that a powder mixture consisting of 40 parts by weight of high-surface-area gamma alumina powder (surface area of about 200 m$^2$/g) and 60 parts by weight of a commercial H-Y zeolite was used in place of the gamma alumina to prepare a coating slurry as therein described. Well-bonded, crack-free coatings were readily provided with slurries of these compositions.

EXAMPLE 8

High Pressure Resistant Catalytic Microreactor

An alumina coating was provided through the use of sol binders in accordance with Example 1 in a glass microreactor made using a vacuum-assisted micromolding process. Because of the particularity of this process allowing a high sintering of the glass particles to seal the two microcell substrates, high resistance to opressure applied inside the channels was observed. Structures fabricated in accordance with the described process have proven experimentally to resist pressure greater than 6 bars and up to 40 bars, depending on the design. The operating pressure of catalytic microreactors such as described herein can be even higher with appropriated design, such as from about 15 bars to about 40 bars, from about 6 bars to about 150 bars, or even from about 6 bars to about 300 bars. The resistance to pressure of these glass microcreators, combined with the presence of alumina coatings having good adhesion properties to the channel walls of such glass microcreators as described herein, provide a unique microcreator which can be used for heterogeneous catalytic reactions where operating conditions require reactants under pressure.

Other additives that can be used in combination with the coating systems of the invention are materials that can increase the thermal conductivity and/or heat capacity of the coating. Specific examples of such additives include powders of silicon carbide (SiC) or silicon nitride (SiN). Coatings of higher heat capacity or conductivity may be useful to help control catalyst temperature in exothermic or endothermic chemical reactions, as well as to reduce the thermal stresses to which the structured catalyst supports may be subjected.

It will be apparent to those skilled in the art that various modifications and variations can be made to the present invention without departing from the spirit and scope of the invention.

While the various systems and method of the present invention may have been shown and described with reference to specific embodiments of the present invention, any and all embodiments may be used in conjunction with any of the systems and methods described herein. Thus, it is intended that the present invention cover the modifications and variations of this invention provided they come within the scope of the appended claims and their equivalents.

The invention claimed is:

1. A microstructure for chemical processing and manufacturing comprising a plurality of microchannel walls defining at least one microchannel for accommodating chemicals to be processed, at least one coating layer adhered to the plurality of microchannel walls defining said at least one microchannel, the coating layer including a catalyst support and a catalyst, wherein the plurality of microchannel walls comprise a frit of a material selected from the group consisting of glass, ceramic, and glass-ceramic, and combinations thereof supported between two or more non-frit planar substrates comprised of glasses, glass ceramics, ceramics, metals, semiconductors or combinations thereof, and wherein at least one of the plurality of microchannel walls further comprises a porous membrane.

2. The microstructure of claim 1 wherein the plurality of microchannel walls comprise a material selected only from the group consisting of glass.

3. The microstructure of claim 1 wherein the plurality of microchannel walls comprise a material selected only from the group consisting of ceramic.

4. The microstructure of claim 1 wherein the plurality of microchannel walls comprise a material selected only from the group consisting of glass-ceramic.

5. The microstructure of claim 1 wherein the at least one coating layer is applied to the plurality of microchannel walls by filling the at least one microchannel with a slurry.

6. The microstructure of claim 1 wherein the at least one coating layer comprises a plurality of coating layers.

7. The microstructure of claim 1 wherein the catalyst support comprises a sol binder.

8. The microstructure of claim 7 wherein the sol binder comprises an alumina sol binder.

9. The microstructure of claim 1 wherein the catalyst support comprises a sinterable particulate solid.

10. The microstructure of claim 9 wherein the sinterable particulate solid comprises boehmite.

11. The microstructure of claim 1 wherein the catalyst support comprises a molecular sieve.

12. The microstructure of claim 11 wherein the molecular sieve comprises a zeolite.

13. The microstructure of claim 1 wherein the catalyst comprises a material selected from the group consisting of group IVA, VA, VIIA, and VIII of the periodic table of elements.

14. The microstructure of claim 13 wherein the catalyst comprises a material selected from the group consisting of platinum, nickel oxide, silicon carbide and silicon nitride.

15. The microstructure of claim 1 wherein the microstructure is capable of operating at internal pressures of between about 6 bars and about 300 bars.

16. The microstructure of claim 1 wherein the microstructure is capable of operating at internal pressures of between about 6 bars and about 150 bars.

17. The microstructure of claim 1 wherein the microstructure is capable of operating at internal pressures of between about 15 bars and about 40 bars.

18. A microstructure for chemical processing and manufacturing comprising a plurality of microchannel walls defining at least one microchannel for accommodating chemicals to be processed, at least one coating layer adhered to interior surfaces of the plurality of microchannel walls defining said at least one microchannel, the coating layer including a catalyst support and a catalyst, the catalyst being uniformly distributed throughout the coating layer, wherein the plurality of microchannel walls comprise a consolidated fired frit of glass supported between two or more planar non-frit substrates comprised of glasses, glass ceramics, ceramics, metals, semiconductors or combinations thereof, and wherein at least one of the plurality of microchannel walls further comprises a porous membrane.

19. The microstructure of claim 18 wherein the coating layer coats all of the interior surfaces of the at least one microchannel.

20. The microstructure of claim 19 wherein the plurality of microchannel walls are able to contain a pressure in the channel of up to 40 Bars.

21. The microstructure of claim 18 wherein the plurality of microchannel walls are able to contain a pressure in the channel of up to 40 Bars.

* * * * *